*(12)* United States Patent
Otaka et al.

(10) Patent No.: US 11,589,419 B2
(45) Date of Patent: Feb. 21, 2023

(54) COMMUNICATION SYSTEM, COMMUNICATION DEVICE, COMMUNICATION SERVER, COMPUTER-READABLE STORAGE MEDIUM AND METHOD OF CONTROLLING A CONNECTION BETWEEN THE COMMUNICATION DEVICE AND AN ACCESS POINT

(71) Applicant: HONDA MOTOR CO., LTD., Tokyo (JP)

(72) Inventors: Masaru Otaka, Wako (JP); Ryusuke Tamanaha, Wako (JP); Takahiro Iijima, Tokyo (JP); Yusuke Oi, Tokyo (JP); Naoko Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 17/123,536

(22) Filed: Dec. 16, 2020

(65) Prior Publication Data

US 2021/0195688 A1   Jun. 24, 2021

(30) Foreign Application Priority Data

Dec. 24, 2019   (JP) .............................. JP2019-233361

(51) Int. Cl.
*H04W 88/08*   (2009.01)
*H04W 88/06*   (2009.01)
(Continued)

(52) U.S. Cl.
CPC ........... *H04W 88/08* (2013.01); *H04W 48/16* (2013.01); *H04W 76/10* (2018.02); *H04W 84/12* (2013.01); *H04W 88/06* (2013.01)

(58) Field of Classification Search
CPC ..... H04W 84/12; H04W 88/08; H04W 48/20; H04W 36/32; H04W 24/02; H04W 48/16;
(Continued)

(56) References Cited

U.S. PATENT DOCUMENTS 8,599,701 B2   12/2013   Horn et al.
9,451,509 B2   9/2016   Sung et al.
(Continued)

FOREIGN PATENT DOCUMENTS

CH   698377 B1 * 7/2009 ............ H04W 88/08
EP   2112858 A1 * 10/2009 ............ H04W 36/32
(Continued)

OTHER PUBLICATIONS

Japanese Office Action for Japanese Patent Application No. 2019-233361 dated Mar. 25, 2022 (partially translated).
(Continued)

*Primary Examiner* — Mahendra R Patel
(74) *Attorney, Agent, or Firm* — Thomas | Horstemeyer, LLP (57) ABSTRACT

A communication system comprises a communication device; an access point (AP); and a communication server is provided. The communication system performs a method comprising: acquiring first information including movement information of the communication device; acquiring second information including position information of the AP; determining a connectable time corresponding to a length of time the communication device moves within a communicable range of the AP on the basis of the first information and the second information; and controlling a connection between the communication device and the AP on the basis of the connectable time.

24 Claims, 6 Drawing Sheets

(51) Int. Cl.
*H04W 84/12* (2009.01)
*H04W 48/16* (2009.01)
*H04W 76/10* (2018.01)

(58) Field of Classification Search
CPC ..... H04W 4/029; H04W 64/00; H04W 88/02; H04W 4/80; H04W 36/08; H04W 4/02; H04W 28/08; H04W 76/10; H04W 48/18; H04W 36/22; H04W 36/30; H04W 8/005; H04W 4/023; H04W 84/005; H04W 4/025; H04W 4/027; H04W 36/0085; H04W 24/04; H04W 4/40; H04W 88/12; H04W 36/00837; H04W 36/0033; H04W 36/0016; H04W 36/36; H04W 40/24; H04W 48/04; H04W 76/25; H04W 52/0254; H04W 40/246; H04W 4/42; H04W 36/06; H04W 40/026; H04W 88/06; H04W 4/48; H04W 48/08; Y02D 10/00; Y02D 30/70; Y02D 30/00
USPC .......................................................... 370/338
See application file for complete search history.

(56) References Cited

U.S. PATENT DOCUMENTS

| | | | |
|---|---|---|---|
| 10,743,251 | B2 | 8/2020 | Horn et al. |
| 2005/0174974 | A1* | 8/2005 | Sonntag ............. B61L 15/0027 370/338 |
| 2010/0112980 | A1* | 5/2010 | Horn .................... H04W 48/20 455/411 |
| 2010/0265827 | A1* | 10/2010 | Horn .................... H04W 72/10 370/329 |
| 2011/0268089 | A1* | 11/2011 | Jaynes ................ G06F 16/9537 370/332 |
| 2014/0105003 | A1* | 4/2014 | Austin ............. H04M 15/8271 370/229 |
| 2014/0308952 | A1 | 10/2014 | Sung et al. |
| 2015/0045021 | A1* | 2/2015 | Schlatter ............... H04W 76/18 455/434 |
| 2015/0110087 | A1* | 4/2015 | Salkintzis ............. H04W 48/20 370/338 |
| 2016/0323801 | A1* | 11/2016 | Serita .................... H04W 40/24 |
| 2017/0339632 | A1 | 11/2017 | Miao et al. |
| 2018/0087921 | A1* | 3/2018 | Suzuki ................... H04W 4/80 |
| 2019/0059037 | A1* | 2/2019 | Nakata ................ H04W 40/026 |

FOREIGN PATENT DOCUMENTS

| | | | | |
|---|---|---|---|---|
| JP | 2004187007 | A | * | 7/2004 |
| JP | 2005-341311 | A | | 12/2005 |
| JP | 2009-206621 | A | | 9/2009 |
| JP | 2016-092711 | A | | 5/2016 |
| JP | 2017130744 | A | * | 7/2017 ........... H04B 7/0491 |
| JP | 2017-538348 | A | | 12/2017 |
| JP | 2018-174531 | A | | 11/2018 |

OTHER PUBLICATIONS

Ruggieri et al.. Modeling of the Handover Dwell Time in Cellular Mobile Communications Systems, IEEE Transactions on Vehicular Technology, May 1998, pp. 489-498, vol. 47, No. 2.

Zonoozi et al., User Mobility Modeling and Characterization of Mobility Patterns, IEEE Journal on Selected Areas in Communications, Sep. 1997, pp. 1239-1252, vol. 15, No. 7.

* cited by examiner

COMMUNICATION SYSTEM, COMMUNICATION DEVICE, COMMUNICATION SERVER, COMPUTER-READABLE STORAGE MEDIUM AND METHOD OF CONTROLLING A CONNECTION BETWEEN THE COMMUNICATION DEVICE AND AN ACCESS POINT

CROSS-REFERENCE TO RELATED APPLICATION(S)

This application claims priority to and the benefit of Japanese Patent Application No. 2019-233361 filed on Dec. 24, 2019, the entire disclosure of which is incorporated herein by reference.

BACKGROUND OF THE INVENTION

Field of the Invention

The present invention relates to a communication system, a communication device, a communication server, and a method of controlling the same and a computer-readable storage medium.

Description of the Related Art

A known communication system for controlling connections determines a base station capable of communicating with a communication device installed in a vehicle from position information of the communication device and position information of the base station. The technology described in Japanese Patent Laid-Open No. 2005-341311 determines a connection destination on the basis of position information of a communication device and communication result information.

However, when the communication device is moving, the connection may be interrupted in a short amount of time even if the communication device is connected to a closely-located base station.

SUMMARY OF THE INVENTION

In light of the problem described above, an object of the present invention is to provide a system capable of increasing the length of time a communication device and a base station are connected.

A communication system according to the present invention comprises: a communication device; an access point (AP); and a communication server wherein the communication system performs a method comprising: acquiring first information including movement information of the communication device; acquiring second information including position information of the AP; determining a connectable time corresponding to a length of time the communication device moves within a communicable range of the AP on the basis of the first information and the second information; and controlling a connection between the communication device and the AP on the basis of the connectable time.

DESCRIPTION OF THE EMBODIMENTS

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1:
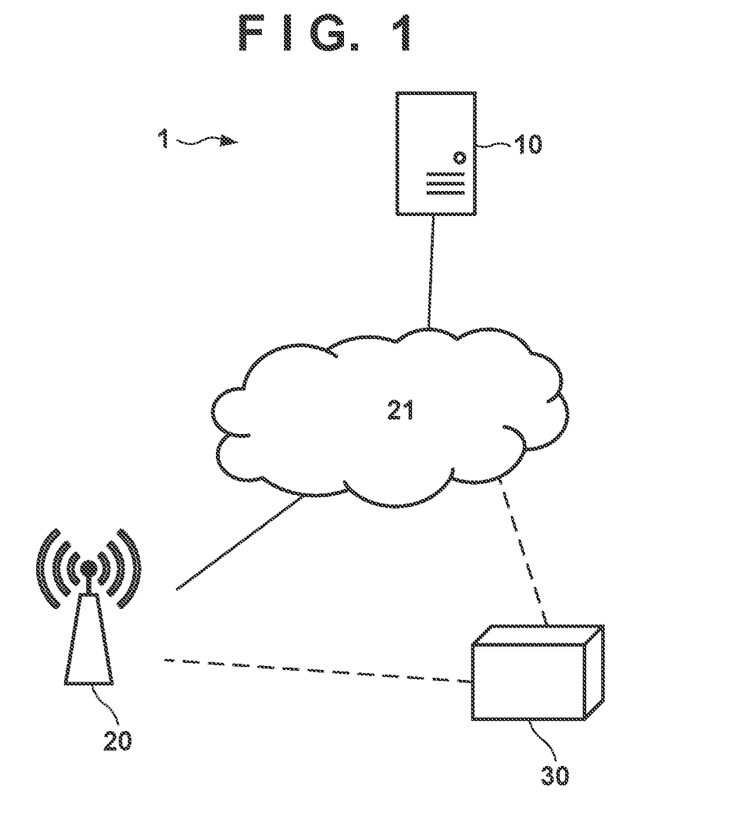
FIG. 1 is a schematic view of a communication system according to a first embodiment.

FIG. 1 is a schematic view of a communication system according to an embodiment of the present invention. A communication system 1 includes a communication server 10, an access point (AP) 20, and an in-vehicle device 30. The in-vehicle device 30 executes processing for connecting to an appropriate AP 20, from among a plurality of connectable APs 20, by acquiring information for identifying the length of time the in-vehicle device 30 can be connected to the AP 20 from the communication server 10.

The communication server 10 is a computer that provides information used to determine the length of time the in-vehicle device 30 can be connected to the AP 20. In FIG. 1, the communication server 10 is illustrated as a single server connected to an Internet 21. However, the function of the communication server 10 may be provided by a plurality of servers connected via a network. Also, the Internet 21 may include an intranet in at least a part thereof.

The AP 20 forms a local access network and, in the case in which the in-vehicle device 30 is located within a communicable range, wirelessly communicates with the in-vehicle device 30, enabling communication via the Internet 21 via the in-vehicle device 30. Note that in the present embodiment, the AP 20 is described as proving wireless communication with the in-vehicle device 30 complying with Wi-Fi (registered trademark). However, the AP 20 may provide wireless communication complying other communication protocols, such as at least one of LTE, LTE-A, or LPWA. The AP 20 is a wireless base station connected to the Internet 21 via a wired connection or a wireless connection and is capable of communication with the communication server 10.

The in-vehicle device 30 is a communication device capable of communicating via the AP 20 with a server (not illustrated) on the Internet 21 or another in-vehicle device (not illustrated). Also, the in-vehicle device 30 of the present embodiment is capable of connecting to a network provided by the AP 20. In the present specification, the in-vehicle device 30 may also be referred to as a terminal 30. In one example, the in-vehicle device 30 is a computer or an electronic control unit (ECU) installed in a moving body, such as a vehicle, a watercraft, or an aircraft.

Next, an example of the hardware configuration of the communication server 10, the AP 20, and the terminal 30 of FIG. 1 will be described with reference to FIGS. 2A to 2C.

Figure 2A:
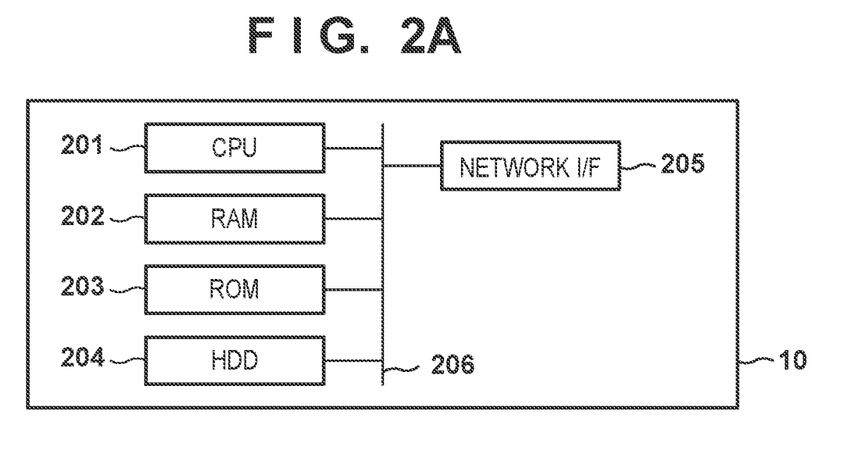
FIG. 2A is a hardware block diagram of a communication server 10 according to the first embodiment.

FIG. 2A is a hardware block diagram of the communication server 10. The communication server 10 includes a CPU 201, random access memory (RAM) 202, read only memory (ROM) 203, a hard disk drive (HDD) 204, and a network interface (I/F) 205. Each unit is communicatively connected to one another via an internal bus 206. The CPU 201 controls the entire processing of the communication server 10. The RAM 202 is a volatile storage area and is used as the working memory of the CPU 201 or the like. The ROM 203 is a non-volatile storage area and stores various programs executed by the CPU 201 and data. The HDD 204 is a non-volatile storage area and stores various data. The network I/F 205 controls communication with external devices via an external network (for example, the Internet 21) and transmits and receives various data. In this communication system, the communication method in terms of wired, wireless, and the like is not limited, and a combination of these may be used.

Figure 2B:
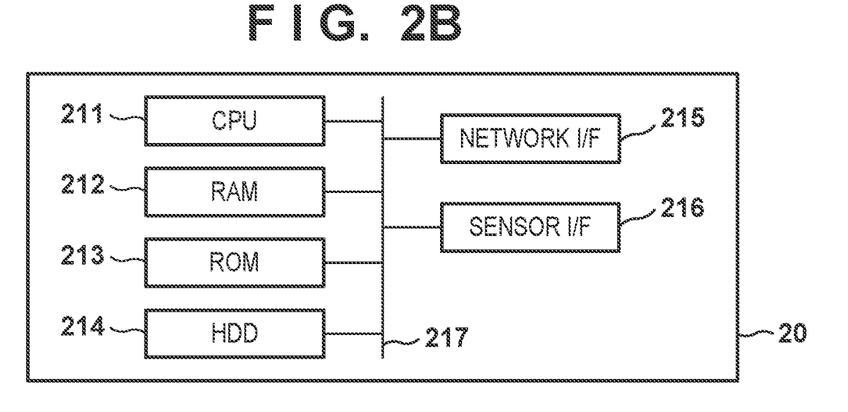
FIG. 2B is a hardware block diagram of an access point 20 according to the first embodiment.

FIG. 2B is a hardware block diagram of the AP 20. The AP 20 includes a CPU 211, RAM 212, ROM 213, a HDD 214, a network I/F 215, and a sensor I/F 216. Each unit is communicatively connected to one another via an internal bus 217. The CPU 211 is similar to the CPU 201, the RAM 212 is similar to the RAM 202, the ROM 213 is similar to the ROM 203, and the HDD 214 is similar to the HDD 204. Thus, description thereof will be omitted. The network I/F 215 controls communication with external devices via an external network (for example, the Internet 21) and includes at least one network I/F for transmitting and receiving various data. Also, the network I/F 215 includes a wireless network I/F capable of communication with the terminal 30 located in the communicable range. The sensor I/F 216 is an interface for acquiring the state of the AP 20 from a sensor (not illustrated) provided in the AP 20 or a sensor (not illustrated) connected to the AP 20. In the present embodiment, the sensor I/F 216 includes a global positioning system (GPS) sensor, and the CPU 211 acquires position information of the AP 20 via a sensor I/F. In an example, the sensor I/F 216 may be connected to an acceleration sensor. Also, the sensor I/F 216 may be capable of acquiring information, such as the number of terminals connected to the network formed by the AP 20, throughput, and the like, as load information of the network formed by the AP 20. Note that in the case in which the AP 20 is moving, movement route information may be stored in the HDD 214 or an input/output I/F that receives movement route information from an external source may be provided.

Figure 2C:
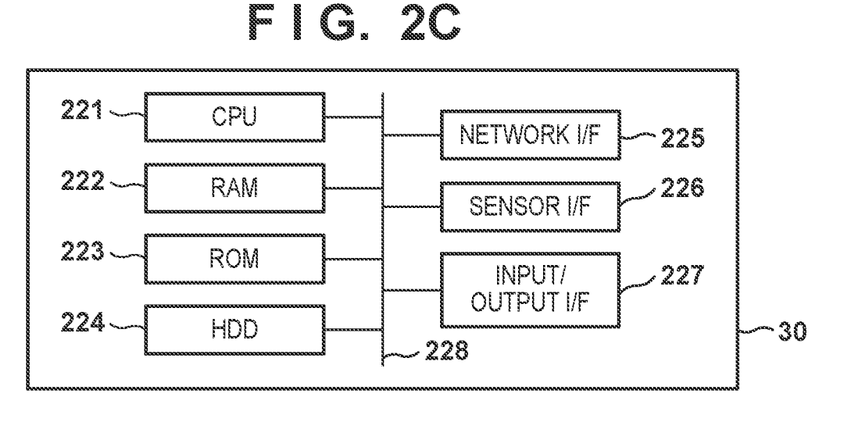
FIG. 2C is a hardware block diagram of an in-vehicle device 30 according to the first embodiment.

FIG. 2C is a hardware block diagram of the terminal 30. The terminal 30 includes a CPU 221, RAM 222, ROM 223, a HDD 224, a network i/F 225, a sensor I/F 226, and an input/output I/F 227. Each unit is communicatively connected to one another via an internal bus 228. The CPU 221 is similar to the CPU 201, the RAM 222 is similar to the RAM 202, the ROM 223 is similar to the ROM 203, and the HDD 224 is similar to the HDD 204. Thus, description thereof will be omitted. The network I/F 225 controls communication with external devices via an external network (for example, the Internet 21) and includes at least one network I/F for transmitting and receiving various data. Note that the network I/F 225 according to the present embodiment includes a short-range radio communication network I/F capable of connection with a short-range radio communication network provided by the AP 20 and a wide area wireless network I/F capable of communication with a wide area wireless communication network such as a mobile communication network. The terminal 30 can communicate with the communication server 10 via the wide area wireless network I/F and connect to a network formed by the AP 20 via the short-range radio communication network I/F. In one example, the network I/F 225 includes a wireless environment measurement function and is capable of measuring signal intensity and/or wireless quality (noise intensity such as signal-to-interference plus noise power ratio (SINR) and the like) from the AP 20 located within the communicable range. The sensor I/F 226 includes a GPS sensor, and the CPU 221 acquires position information of the terminal 30 via the sensor I/F 226. In another example, the sensor I/F 226 may detect the communication amount required by the terminal 30. The input/output I/F 227, for example, is an input/output device capable of at least one of notification of information or reception of operation input with respect to a user of the terminal 30, such as an occupant of a vehicle installed with the terminal 30. In one example, the input/output I/F 227 is an input device including at least one of a display device, such as a display, or a speaker. In another example, the input/output I/F 227 is an output device including at least one of a button, keys, a camera, a touch panel display, or a microphone. In an example, the terminal 30 is capable of acquiring a planned travel route of the vehicle installed with the terminal 30 via the input/output I/F 227.

Software Configuration

Figure 3A:
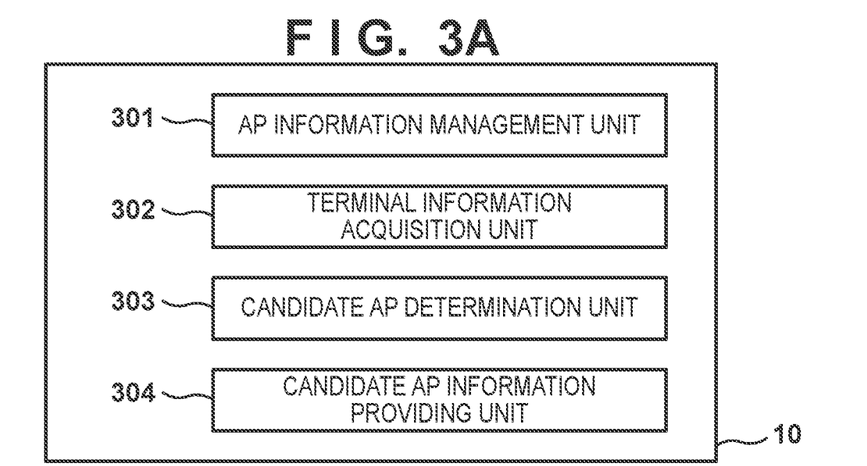
FIG. 3A is a software block diagram of the communication server 10 according to the first embodiment.

FIG. 3A is a diagram illustrating the software of the communication server 10 according to the present embodiment. The software module of the communication server 10 illustrated in FIG. 3A is implemented by the CPU 201 executing a program stored on the RAM 202 to control the communication server 10. The software module of the communication server 10 is provided with an AP information management unit 301, a terminal information acquisition unit 302, a candidate AP determination unit 303, and a candidate AP information providing unit 304.

The AP information management unit 301 receives, from the AP 20, AP information including at least one of position information of the AP 20 described below, movement information, communicable range information, or load information and stores the AP information in a storage unit (for example, the HDD 204). In one example, the AP information management unit 301 may store information indicative of whether or not use of the AP 20 is permitted and/or information indicative of whether or not use of the AP 20 is recommended these pieces of information being set by the administrator of the AP 20. Also, in one example, the AP information management unit 301 may associate with and store in the AP 20 result information relating to the amount of time the terminal 30 was connected to the AP 20 previously or the communication amount and/or evaluation information relating to the communication quality of the AP 20 received from the user of the terminal 30.

The terminal information acquisition unit 302 receives, from the terminal 30, terminal information including at least one of position information, movement information, or wireless quality information of the terminal 30 (described below). The candidate AP determination unit identifies the AP 20 capable of connection with the terminal 30 from the terminal information of the terminal 30 and the AP information. The candidate AP information providing unit 304 generates information (candidate AP information) used for connecting the terminal 30 to the AP 20 the terminal 30 is capable of connection with and transmitting the information to the terminal 30.

Figure 3B:
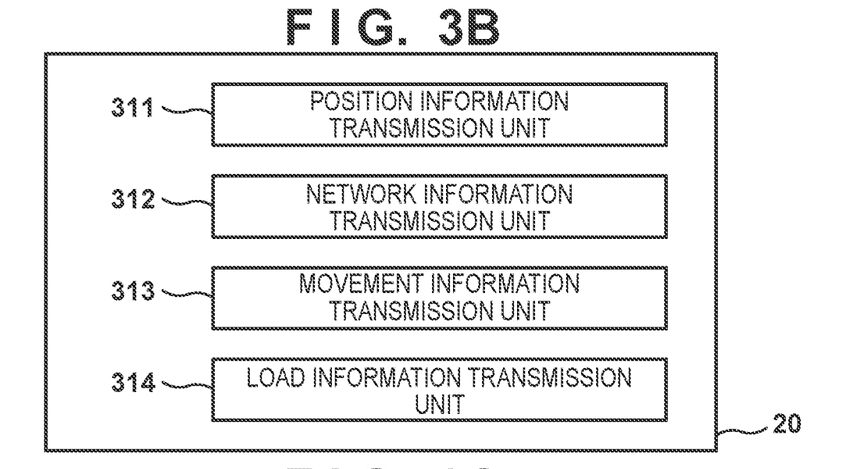
FIG. 3B is a software block diagram of the access point 20 according to the first embodiment.

FIG. 3B is the software configuration of the AP 20 according to the present embodiment. The software module of the AP 20 illustrated in FIG. 3B is implemented by the CPU 211 executing a program stored on the RAM 212 to control the AP 20. The software module of the AP 20 includes the position information transmission unit 311 and a network information transmission unit 312. Also, the AP 20 optionally includes a movement information transmission unit 313 and a load information transmission unit 314.

The position information transmission unit 311 acquires the position information of the AP 20 via the sensor I/F 216 and transmits the position information to the communication server 10. In one example, the position information may include information of the orientation and/or height of the AP 20. The network information transmission unit 312 acquires information relating to the network formed by the AP 20 and transmits the information to the communication server 10. In one example, in the case in which the AP 20 forms a wireless local area network, the network information transmission unit 312 transmits the identifier (SSID) of the access point and the password to the communication server 10. In another example, the network information transmission unit 312 may transmit, to the communication server 10, information corresponding to at least one of the directivity of the antenna of the AP 20, the transmission signal intensity of the AP 20, or the unit type. In yet another example, the network information transmission unit 312 may transmit, to the communication server 10, information relating to information relating to the load of the network such as the communication amount within a predetermined time period of the network formed by the AP 20 and/or information relating to wireless quality detected by the AP 20 (noise intensity, such as signal-to-interference plus noise power ratio (SINR), and packet loss ratio). The movement information transmission unit 313 transmits, to the communication server 10, information relating to the movement route, such as movement direction and movement speed, in the case in which the AP 20 is moving.

Figure 3C:
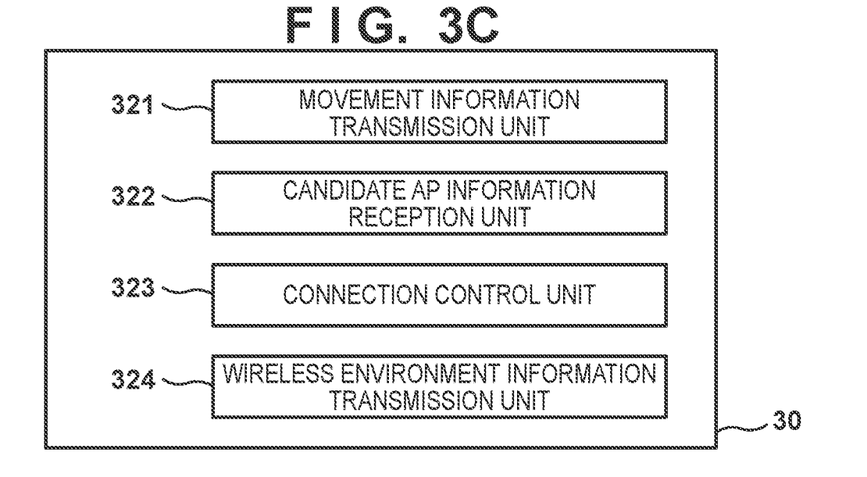
FIG. 3C is a software block diagram of the in-vehicle device 30 according to the first embodiment.

FIG. 3C is the software configuration of the terminal 30 according to the present embodiment. The software module of the terminal 30 illustrated in FIG. 3C is implemented by the CPU 221 executing a program stored on the RAM 222 to control the terminal 30. The software module of the terminal 30 includes a movement information transmission unit 321, a candidate AP information reception unit 322, and a connection control unit 323. Also, the terminal 30 optionally includes a wireless environment information transmission unit 324.

The movement information transmission unit 321 transmits movement information including information of the position of the terminal 30 obtained via the sensor I/F 226, movement direction, movement speed, and the like to the communication server 10. In one example, the movement information may include information relating to the planned movement route. The candidate AP information reception unit 322 receives, from the communication server 10, the candidate AP information used for connecting to the connectable AP 20. The connection control unit 323 uses the candidate AP information received from the communication server 10, connects to the AP 20, and performs communication. The wireless environment information transmission unit 324 measures the wireless environment information, such as the received signal strength indicator (RSSI) and the signal-to interference plus noise power ratio (SINR), relating to the wireless environment where the terminal 30 is located and transmits the information to the communication server 10.

Next, an example of processing executed by the communication server 10, the AP 20, and the terminal 30 according to the present embodiment will be described with reference to FIG. 4. The AP 20 executes the processing of FIG. 4 at intervals of a predetermined amount of time. Regarding the terminal 30, when power is supplied to a vehicle installed with the terminal 30, the processing is started by the CPU 221 executing a program stored on the RAM 222 and when the vehicle is travelling, or the connection with the AP 20 is interrupted, or when a communication capacity equal to or greater than a predetermined amount per a predetermined amount of time is required to execute a streaming application or the like, the processing is executed again.

First, the AP 20 acquires AP information including position information of the AP 20 and network information used for connection with the AP 20 (step S401) and transmit the AP information to the communication server 10 (step S402). Note that the position information and the network information may be sent separately or, only in the case in which the AP 20 forms the network for the first time or the network settings are changed, the network information may be transmitted. Also, the AP 20 may transmit the position information only in the case in which the position of the AP 20 changes. Note that in the case in which the AP 20 is moving, the AP information may include movement information. Also, in one example, the network information, as described above, may include information relating to the transmission radio wave intensity, directivity, and unit type of the AP 20, information relating to a noise level detected by the AP 20, or load information of the AP 20. Next, the communication server 10, having received the AP information from the AP 20 in step S403, moves the processing forward to step S404 and stores the received AP information in a storage unit such as the HDD 204. Note that, when AP information is received from the same AP 20 a number of times, i.e., when AP information from an AP 20 with its AP information already stored in the storage unit is received, the old AP information may be replaced with the new AP information.

Next, the terminal 30 acquires the terminal information including the movement information of the terminal 30 in step S405, and transmits the information to the communication server 10 in step S406. Also, in one example, in step S405, the terminal 30 measures the information relating to the wireless communication quality and transmits the information to the communication server 10. For example, the information relating to the wireless communication quality may include an access point name (SSID) detected by the terminal 30 scanning within a predetermined frequency band, a reception signal intensity (RSSI) of a beacon received from an access point by the terminal 30, and the like.

Next, the communication server 10, having received the terminal information from the terminal 30 in step S407, moves the processing forward to step S408 and searches for the AP 20 the terminal 30 can connect to from the received AP information and the terminal information. Here, from the position of the AP 20 included in the AP information and the position of the terminal 30 included in the terminal information, if the AP 20 and the terminal 30 are within a predetermined distance of one another, it can be determined that the AP 20 can connect to the terminal 30. Also, in the case in which an identifier of the AP 20 can be identified using the wireless quality information such as SSID of the detected AP, the AP 20 that the terminal 30 can connect to may be identified from only the terminal information.

Note that the terminal 30 may actually be unable to connect to the AP 20 identified by the communication server 10 in step S408 and determined to be connectable by the terminal 30. For example, in the case in which the communication server 10 determines whether or not the terminal 30 and the AP 20 are connectable from the position of the terminal 30 and the position of the AP 20, in the processing of step S409 described below, the communication server 10 may determine that connection is not actually suitable. Note that in step S408, in the case in which it is determined that there are no APs 20 that the terminal 30 can connect to, the communication server 10 may transmit an error message to the terminal 30 and stop the processing from thereon. Next, the processing proceeds to step S409, and the communication server 10 calculates the length of time the terminal 30 can be connected to the AP 20 (connectable time) for each AP 20 determined to be connectable by the terminal 30.

Figure 5A:
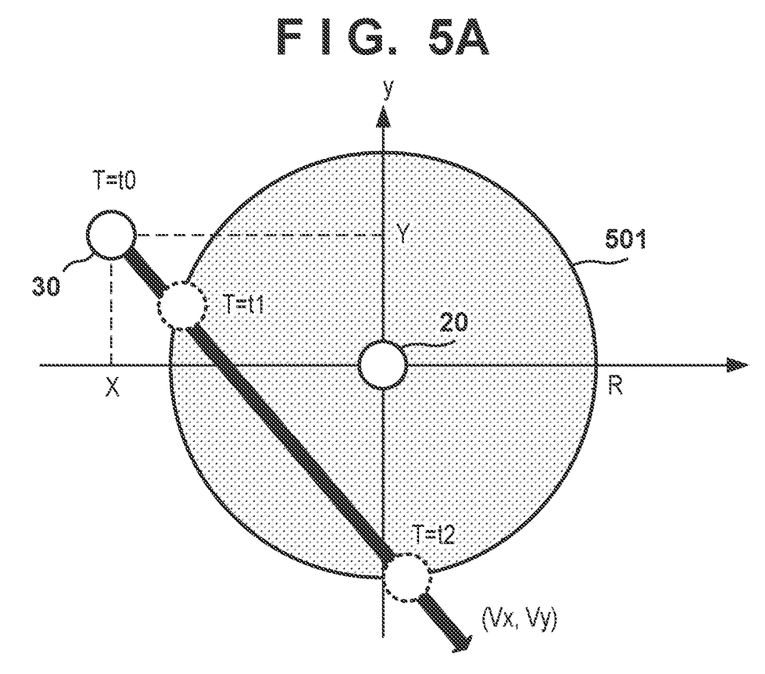
FIGS. 5A and 5B are diagrams for explaining how connectable time is calculated according to the first embodiment.

Next, an example of a method of calculating the connectable time will be described with reference to FIGS. 5A and 5B. In this example, the terminal 30 of FIG. 5A is located at a relative position (X, Y) with respect to the AP 20 and is moving at a relative velocity (Vx, Vy) with respect to the AP 20 at a time point to. Also, in this example, the AP 20 has a communicable range 501 shaped as a perfect circle with a radius R. Here, an estimated time of the terminal 30 entering the communicable range 501 of the AP 20 is defined as t1 and an estimated time of leaving the communicable range 501 is defined as t2 to give the following Equations.

$$(X+t1*Vx)^2+(Y+t1*Vy)=R^2$$

$$(X+t2*Vx)^2+(Y+t2*Vy)=R^2$$

By solving the two Equations for the estimated time t1 and t2, the communication server 10 can estimate the length of time t2−t1 that the terminal 30 and the AP 20 can be connected. Also, in the case in which the communication speed of the AP 20 can be acquired by the communication server 10 for example, from the communication speed and the length of the connectable time, the communication capacity capable of being communicated by the terminal 30 connecting to the AP 20 can be estimated.

Note that in the present embodiment, the AP 20 was described as having a communicable range shaped as a perfect circle. However, in a similar manner, in the case in which the AP 20 or the terminal 30 is provided with an antenna with directivity, by calculating the relative position and the relative velocity of the AP 20 and the terminal 30 and the relative orientation, the connectable length of time can be calculated. For example, with the communicable range of the AP 20 represented by X-Y coordinates, by determining whether or not the relative position coordinates (X+t*Vx, Y+t*Vy) of the terminal 30 at time t is within the communicable range of the AP 20, the connectable time of the terminal 30 can be determined.

Note that the radius of the communicable range of the AP 20 may be a value such as 30 m common among different APs 20, may be a value associated to each different unit type of the AP 20, or may be a value associated to each different output intensity of the AP 20. In other words, the communicable range of the AP 20 used for determining the connectable time between the terminal 30 and the AP 20 by the communication server 10 may not be the same as the actual communicable range of the AP 20 or may be a communicable range estimated by the communication server 10.

Figure 5B:
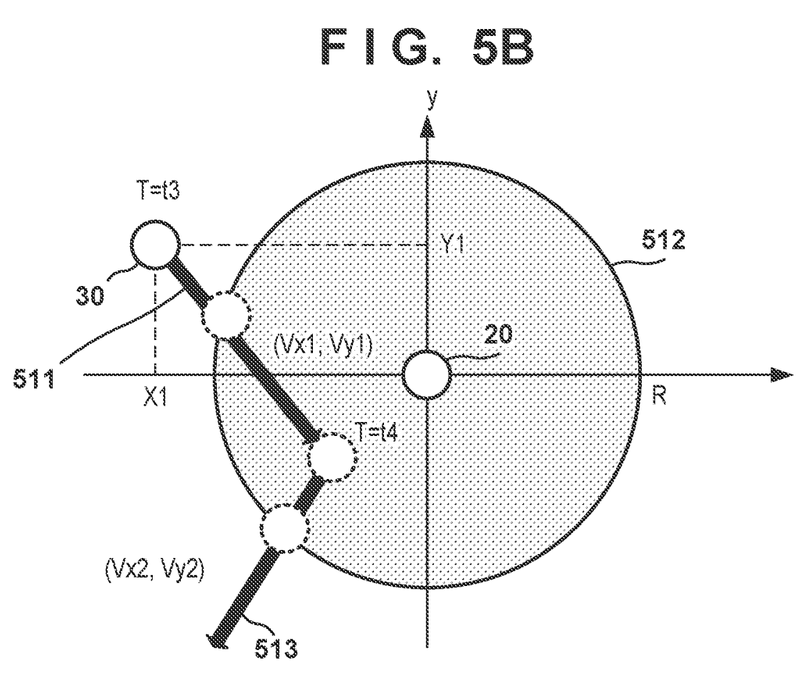

Next, in this example, the terminal 30 of FIG. 5B is travelling along a route 511 from a time t3 and the AP 20 has a communicable range 512. In this example, the terminal 30 is located at a relative position (X1, Y1) with respect to the AP 20 at the time t3, the terminal 30 is travelling at a relative velocity (Vx1, Vy1) with respect to the AP 20, and, due to turning right at an estimated time t4, the terminal 30 is travelling along a route 513 at a relative velocity (Vx2 Vy2) with respect to the AP 20. In this example, by determining whether or not the terminal 30 will enter the communicable range 512 of the AP 20 between the time 3 and the time t4 or after the time 14 and determining whether or not the terminal 30 will leave the communicable range 512 of the AP 20 between the time t3 and the time t4 or after the time t4, the length of the time the terminal 30 can connect to the AP 20 can be estimated.

Figure 4:
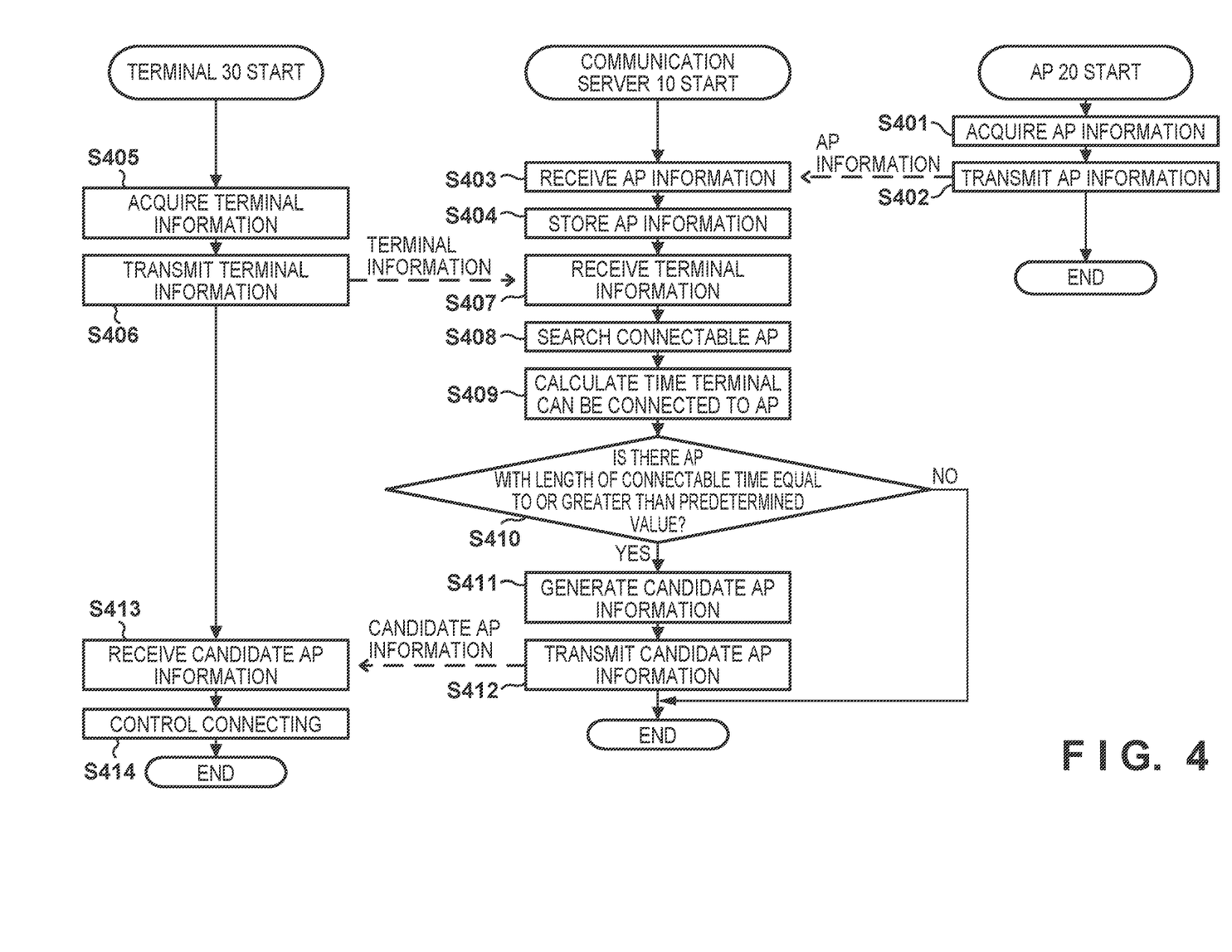
FIG. 4 is a sequence diagram of an example of the processing of the communication system according to the first embodiment.

Following on from step S409 of FIG. 4, the processing moves forward to step S410, and the communication server 10 determines whether or not there is an AP for which a length of the connectable time with the terminal 30 is equal to or greater than a predetermined value from among the APs 20 with a calculated connectable time. The predetermined value may be a numerical value, such as 30 seconds, 1 minute, or the like, that is preset in the communication server 10. Alternatively, whether or not there are a predetermined number, for example, 5, of APs 20 with a connectable time of 10 seconds or greater listed in descending order may be determined. Note that in step S410, in addition to the length of the connectable time with the terminal 30, whether or not there is an AP with a communication load equal to or less than a predetermined value, whether or not there is the AP 20 that satisfies a condition other than the length of the connectable time, or the like may be determined. Note that in the case in which the AP information management unit 301 of the communication server 10 stores the result information and/or the evaluation information of the AP 20 described above, whether or not the AP 20 satisfies a predetermined condition may be determined on the basis of at least one of the result information or the evaluation information. Also, in the case in which the communication server 10 receives the wireless environment information from the AP 20, the AP 20 with low environmental noise may be selected. In this way, the communication server 10 can determine the AP 20 that can connect to the terminal 30 on the basis of previous communication history of the AP 20, evaluation from a user, and wireless environment information of the terminal 30, in addition to the length of the connectable time.

Next, the processing proceeds to step S411 and the communication server 10 generates, as candidate AP information, information for connection with at least one AP 20 from among the APs 20 for which a length of the connectable time with the terminal 30 is equal to or greater than a predetermined length and transmits the information to the terminal 30 in step S412. The candidate AP information may include at least one of SSID, a wireless LAN password, or an IP address, for example. Also, the candidate AP information may include a value corresponding to the length of the connectable time with the terminal 30. Also, in the case in which the communication server 10 generates the candidate AP information on the basis of previous communication history of the AP 20, evaluation from a user, and wireless environment information of the terminal 30, the candidate AP information may include a value corresponding to a level recommending a connection calculated by the communication server 10.

Next, the terminal 30 executes control for connecting to the AP 20 (step S414) on the basis of the candidate AP information received in step S413. For example, in step S414, the terminal 30 may display the candidate AP information via the input/output I/F 227 on the display unit, receive a user selection of which AP 20 to connect to, and connect to the selected AP 20. Alternatively, in step S414, the terminal 30 may notify the user via the input/output I/F 227 with a message inquiring whether to permit connection to one of the APs 20 included in the candidate AP information, receive permission from the user, and connect to the AP 20. Alternatively, in step S414, the terminal 30 may autonomously connect to one of the APs 20 included in the candidate AP information, such as the AP 20 with the longest connectable time, the AP 20 with the highest level recommending connection, or the like.

As described above, the communication system 1 according to the present embodiment determines the length of time the terminal 30 and the AP 20 can be connected to one another and controls the connection between the terminal 30 and the AP 20 on the basis of the position information of the AP 20 and the movement information of the terminal 30. In this way, the connectable time between the terminal 30 and the AP 20 can be lengthened, and the likelihood of connection being frequently interrupted can be reduced.

Second Embodiment

In the communication system of the first embodiment described above, the communication server 10 identifies a candidate AP from terminal information and AP information. In the communication system of the second embodiment described below, the terminal 30 identifies a candidate AP from terminal information and AP information. Note that description of configurations, processing, and functions that are similar to that of the first embodiment will be omitted.

Figure 6:
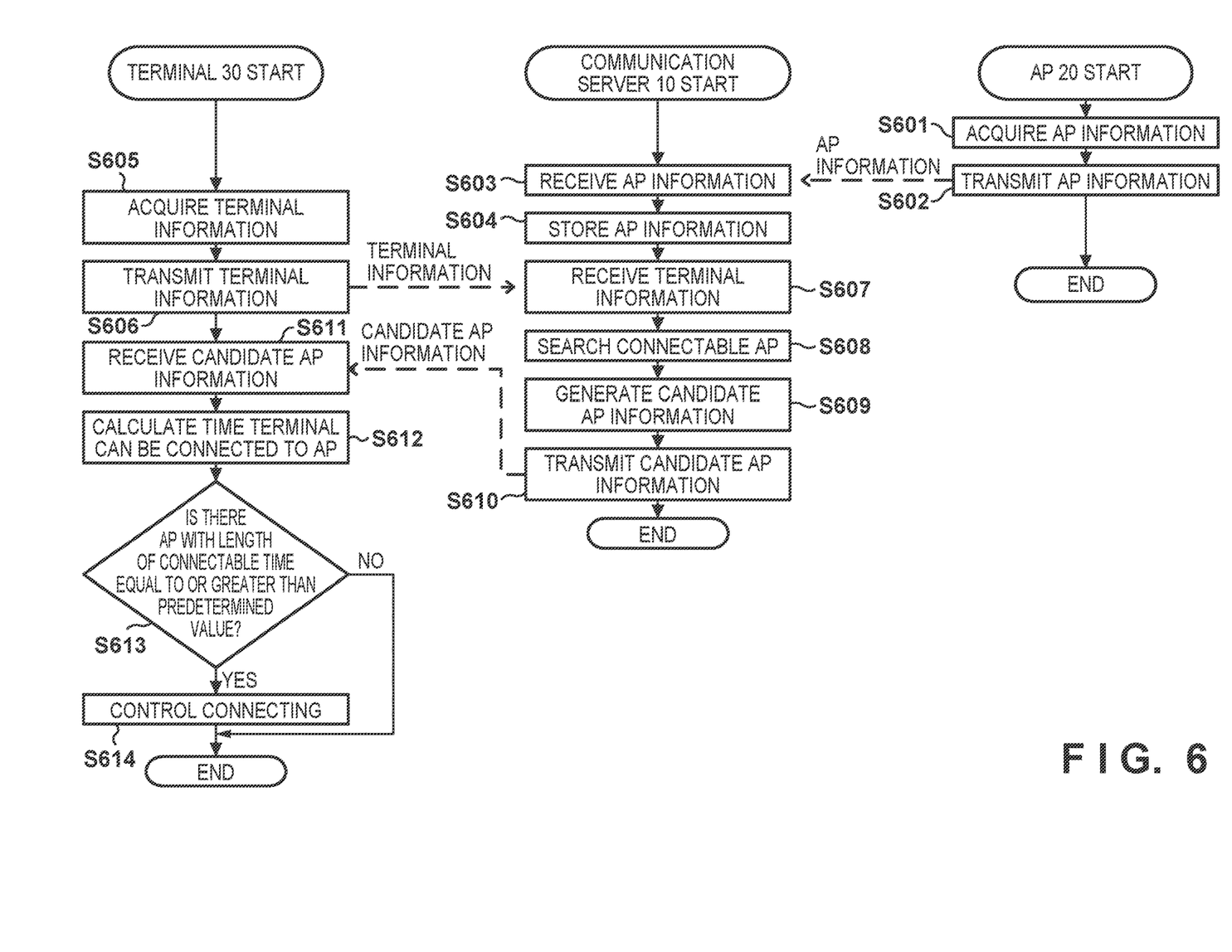
FIG. 6 is a sequence diagram of an example of the processing of a communication system according to a second embodiment.

First, the communication system according to the second embodiment will be described with reference to FIG. 6. The processing of step S601 to step S608 is similar to the processing of step S401 to step S408 of the first embodiment illustrated in FIG. 4, and thus description thereof will be omitted. In step S609, the communication server 10 generates candidate AP information of the AP 20 the terminal 30 can connect to on the basis of the received movement information of the terminal 30 and the position information of a plurality of APs 20 and transmits the information to the terminal 30 in step S610. Note that in a similar manner as in step S408 of FIG. 4 described above, the terminal 30 may actually be unable to connect to the AP 20 identified by the communication server 10 in step S608 and connectable by the terminal 30. For example, in the case in which the communication server 10 determines whether or not the terminal 30 and the AP 20 are connectable from the position of the terminal 30 and the position of the AP 20, in the processing of step S612 described below, the communication server 10 may determine that connection is not actually possible.

Next, the processing proceeds to step S612, and the terminal 30 that received the candidate AP information transmitted from the communication server 10 in step S610 (step S611) calculates the connectable time for each of the connectable APs 20 received in step S611. In step S612, a calculation method similar to the calculation method described in step S409 of FIG. 4 is used. Next, in step S613, the terminal 30 determines whether or not there is the AP 20 with a connectable time equal to or greater than a predetermined length. If there is the AP 20 with a connectable time equal to or greater than the predetermined length (Yes in step S613), the processing proceeds to step S614, and control is executed to control to one of the APs 20 with a connectable time equal to or greater than the predetermined length.

As described above, the terminal 30 according to the present embodiment determines the AP 20 connectable for a predetermined length of time or greater from among the APs 20 that the terminal 30 can connect to on the basis of the position information of the AP 20 and the position information of the terminal 30 and connected to the AP 20. In this way, in the case of the terminal 30 connecting to the AP 20, the terminal 30 can connect to the AP 20 expected to provide a connection a predetermined length of time or greater.

Other Embodiments

The invention is not limited to the embodiments described above, and various modifications and changes are possible within the scope of the invention.

For example, both the communication server 10 and the terminal 30 may calculate the length of time the terminal 30 and the AP 20 can connect to one another. In this case, the terminal 30 may connect to the AP 20 when both the communication server 10 and the terminal 30 determine that the expected length of time the terminal 30 can be connected to the AP 20 is equal to or greater than a predetermined length of time.

Also, in the present embodiment described above, the in-vehicle device 30 connects to a network formed by the access point 20. However, the in-vehicle device 30 may connect to a network formed by the in-vehicle device 30. In other words, in the case in which a single in-vehicle device 30 functions as an access point, the communication system 1 may execute the processing described above to connect another in-vehicle device 30 to the in-vehicle device 30 functioning as an access point. In this case, the in-vehicle device 30 functioning as an access point executes the processing corresponding to step S401 and step S402 of FIG. 4.

Summary of Embodiments

1. A communication system according to the embodiment described above is a communication system (for example, the communication system 1) including:
a communication device (for example, the terminal 30); an access point (AP) (for example, the AP 20); and a communication server (for example, the communication server 10), wherein
the communication system includes
first acquisition unit configured to acquire (for example, step S407, step S607) first information including movement information of the communication device,
second acquisition unit configured to acquire (for example, step S403, step S603) second information including position information of the AP,
determination unit configured to determine (for example, step S409, step S612) a connectable time corresponding to a length of time the communication device moves within a communicable range of the AP on the basis of the first information and the second information, and
control unit configured to control connection between the communication device and the AP on the basis of the connectable time.

In this way, a system can be provided that is capable of increasing the length of time a communication device and a base station are connected.

2. The control unit of the embodiment described above controls connection between the communication device and the AP with for which the connectable time with the communication device is equal to or greater than a predetermined length of time.

In this way, the length of time a communication device and a base station are connected can be equal to or greater than a predetermined length of time.

3. The determination unit of the embodiment described above is included in the communication server.

In this way, a system can be provided that is capable of increasing the length of time a communication device and a base station are connected.

4. The determination unit of the embodiment described above is included in the communication device.

In this way, a system can be provided that is capable of increasing the length of time a communication device and a base station are connected.

5. The second information of the embodiment described above further includes information that can identify the communicable range of the AP.

In this way, the length of time a communication device and a base station are connected can be accurately determined.

6. The second information of the embodiment described above further includes information corresponding to a transmission signal intensity of the AP.

In this way, the length of time a communication device and a base station are connected can be accurately determined.

7. The second information of the embodiment described above further includes information corresponding to directivity of an antenna provided in the AP.

In this way, the length of time a communication device and a base station are connected can be accurately determined.

8. The first information according to the embodiment described above includes wireless environment information relating to a wireless environment measured by the communication device, and the control unit estimates a length of connectable time with the AP further on the basis of the wireless environment information.

In this way, the length of time a communication device and a base station are connected can be accurately determined using actual wireless environment information.

9. The second information of the embodiment described above further includes information relating to a planned movement route of the AP.

In this way, a system can be provided that is capable of increasing the length of time a communication device and a base station are connected even when the AP is moving.

10. The control unit according to the embodiment described above, in a case in which the communication device moves within the communicable range of a plurality of the APs, displays information relating to at least one of the plurality of APs on a display unit and receives a user selection of which one of the plurality of APs to connect to.

In this way, a system in which a communication device and a base station can connect on the basis of a user selection can be provided.

11. The control unit according to the embodiment described above, in a case in which the communication device moves within the communicable range of a plurality of the APs, autonomously selects which one of the plurality of APs to connect to on the basis of the connectable time.

In this way, a system in which a communication device and a base station can autonomously connect can be provided.

12. A communication device according to the embodiment described above includes:

transmission unit configured to transmit first information including movement information of the communication device to a communication server;

reception unit configured to receive second information including position information of an access point (AP) from the communication server:

determination unit configured to determine a connectable time corresponding to a length of time the communication device moves within a communicable range of the AP on the basis of the first information and the second information received by the reception unit, and control unit configured to control connection with the AP on the basis of the connectable time determined by the determination unit.

In this way, a system can be provided that is capable of increasing the length of time a communication device and a base station are connected.

13. A communication server according to the embodiment described above includes:

first information acquisition unit configured to acquire first information including movement information of a communication device from the communication device:

second information acquisition unit configured to acquire second information including position information of an access point (AP) from the AP:

determination unit configured to determine a connectable time corresponding to a length of time the communication device moves within a communicable range of the AP on the basis of the first information and the second information; and transmission unit configured to generate AP information relating to the AP on the basis of the connectable time determined by the determination unit and transmitting the AP information to the communication device.

In this way, a system can be provided that is capable of increasing the length of time a communication device and a base station are connected.

14. A method of controlling a communication device according to the embodiment described above includes the steps of:

transmitting first information including movement information of the communication device to a communication server;

receiving second information including position information of an access point (AP) from the communication server;

determining a connectable time corresponding to a length of time the communication device moves within a communicable range of the AP on the basis of the first information and the second information received in the receiving step; and controlling connection with the AP on the basis of the connectable time determined in the determining step.

In this way, a system can be provided that is capable of increasing the length of time a communication device and a base station are connected.

15. A method of controlling a communication server according to the embodiment described above includes the steps of:

acquiring first information including movement information of a communication device from the communication device:

acquiring second information including position information of an access point (AP) from the AP:

determining a connectable time corresponding to a length of time the communication device moves within a communicable range of the AP on the basis of the first information and the second information; and generating AP information relating to the AP on the basis of the connectable time determined in the determining step and transmitting the AP information to the communication device.

In this way, a system can be provided that is capable of increasing the length of time a communication device and a base station are connected.

16. A program according to the embodiment described above causing a computer to execute a control method including the steps of:

transmitting first information including movement information of the communication device to a communication server;

receiving second information including position information of an access point (AP) from the communication server;

determining a connectable time corresponding to a length of time the communication device moves within a communicable range of the AP on the basis of the first information and the second information received in the receiving step; and controlling connection with the AP on the basis of the connectable time determined in the determining step.

In this way, a system can be provided that is capable of increasing the length of time a communication device and a base station are connected.

17. A program according to the embodiment described above causing a computer to execute a control method including the steps of:

acquiring first information including movement information of a communication device from the communication device;

acquiring second information including position information of an access point (AP) from the AP;

determining a connectable time corresponding to a length of time the communication device moves within a communicable range of the AP on the basis of the first information and the second information; and generating AP information relating to the AP on the basis of the connectable time determined in the determining step and transmitting the AP information to the communication device.

In this way, a system can be provided that is capable of increasing the length of time a communication device and a base station are connected.

What is claimed is:

1. A communication system comprising:

a communication device; an access point (AP); and a communication server wherein the communication system performs a method comprising:

acquiring first information including movement information of the communication device;

acquiring second information including position information of the AP;

determining a connectable time corresponding to a length of time the communication device moves within a communicable range of the AP on the basis of the first information and the second information; and controlling a connection between the communication device and the AP on the basis of the connectable time, wherein the second information further includes information relating to a planned movement route of the AP.

2. The communication system according to claim 1, wherein the controlling the connection comprises controlling the connection between the communication device and the AP for which the connectable time with the communication device is equal to or greater than a predetermined length of time.

3. The communication system according to claim 1, wherein the determining the connectable time is performed by the communication server.

4. The communication system according to claim 1, wherein the determining the connectable time is performed by the communication device.

5. The communication system according to claim 1, wherein the second information further includes information that can identify the communicable range of the AP.

6. The communication system according to claim 5, wherein the second information further includes information corresponding to a transmission signal intensity of the AP.

7. The communication system according to claim 5, wherein the second information further includes information corresponding to directivity of an antenna provided in the AP.

8. The communication system according to claim 1, wherein the first information includes wireless environment information relating to a wireless environment measured by the communication device, and the controlling the connection comprises estimating a length of connectable time with the AP further on the basis of the wireless environment information.

9. The communication system according to claim 1, wherein in a case in which the communication device moves within the communicable range of a plurality of APs, the controlling the connection comprises displaying information relating to at least one of the plurality of APs on a display unit and receiving a user selection of which one of the plurality of APs to connect to.

10. The communication system according to claim 1, wherein in a case in which the communication device moves within the communicable range of a plurality of APs, the controlling the connection comprises autonomously selecting which one of the plurality of APs to connect to on the basis of the connectable time.

11. A communication device for performing a method comprising:

transmitting first information including movement information of the communication device to a communication server;

receiving second information including position information of an access point (AP) from the communication server;

determining a connectable time corresponding to a length of time the communication device moves within a communicable range of the AP on the basis of the first information and the second information, and controlling a connection with the AP on the basis of the connectable time, wherein the second information further includes information relating to a planned movement route of the AP.

12. A communication server for performing a method comprising:

acquiring first information including movement information of a communication device from the communication device;

acquiring second information including position information of an access point (AP) from the AP;

determining a connectable time corresponding to a length of time the communication device moves within a communicable range of the AP on the basis of the first information and the second information; and generating AP information relating to the AP on the basis of the connectable time and transmitting the AP information to the communication device, wherein the second information further includes information relating to a planned movement route of the AP.

13. A method of controlling a communication device, the method comprising:

transmitting first information including movement information of the communication device to a communication server;

receiving second information including position information of an access point (AP) from the communication server;

determining a connectable time corresponding to a length of time the communication device moves within a communicable range of the AP on the basis of the first information and the second information; and controlling connection with the AP on the basis of the connectable time, wherein the second information further includes information relating to a planned movement route of the AP.

14. A method of controlling a communication server, the method comprising:

acquiring first information including movement information of a communication device from the communication device;

acquiring second information including position information of an access point (AP) from the AP;

determining a connectable time corresponding to a length of time the communication device moves within a communicable range of the AP on the basis of the first information and the second information; and generating AP information relating to the AP on the basis of the connectable time and transmitting the AP information to the communication device;

wherein the second information further includes information relating to a planned movement route of the AP.

15. A non-transitory computer-readable storage medium that stores a program for causing a computer to execute the method according to claim 13.

16. A non-transitory computer-readable storage medium that stores a program for causing a computer to execute the method according to claim 14.

17. A communication system comprising:

a communication device; an access point (AP); and a communication server wherein the communication system performs a method comprising:

acquiring first information including movement information of the communication device;

acquiring second information including position information of the AP;

determining a connectable time corresponding to a length of time the communication device moves within a communicable range of the AP on the basis of the first information and the second information; and controlling a connection between the communication device and the AP on the basis of the connectable time, wherein the first information further includes information relating to a planned movement route of the communication device.

18. A communication device for performing a method comprising:

transmitting first information including movement information of the communication device to a communication server;

receiving second information including position information of an access point (AP) from the communication server;

determining a connectable time corresponding to a length of time the communication device moves within a communicable range of the AP on the basis of the first information and the second information, and controlling a connection with the AP on the basis of the connectable time, wherein the first information further includes information relating to a planned movement route of the communication device.

19. A communication server for performing a method comprising;

acquiring first information including movement information of a communication device from the communication device;

acquiring second information including position information of an access point (AP) from the AP;

determining a connectable time corresponding to a length of time the communication device moves within a communicable range of the AP on the basis of the first information and the second information; and generating AP information relating to the AP on the basis of the connectable time and transmitting the AP information to the communication device, wherein the first information further includes information relating to a planned movement route of the communication device.

20. A method of controlling a communication device, the method comprising:

transmitting first information including movement information of the communication device to a communication server;

receiving second information including position information of an access point (AP) from the communication server;

determining a connectable time corresponding to a length of time the communication device moves within a communicable range of the AP on the basis of the first information and the second information; and controlling connection with the AP on the basis of the connectable time, wherein the first information further includes information relating to a planned movement route of the communication device.

21. A method of controlling a communication server, the method comprising;

acquiring first information including movement information of a communication device from the communication device;

acquiring second information including position information of an access point (AP) from the AP;

determining a connectable time corresponding to a length of time the communication device moves within a communicable range of the AP on the basis of the first information and the second information; and generating AP information relating to the AP on the basis of the connectable time and transmitting the AP information to the communication device, wherein the first information further includes information relating to a planned movement route of the communication device.

22. A non-transitory computer-readable storage medium that stores a program for causing a computer to execute the method according to claim 20.

23. A non-transitory computer-readable storage medium that stores a program for causing a computer to execute the method according to claim 21.

24. The communication system of claim 1, wherein the planned movement route further comprises a planned travel route of a vehicle.

\* \* \* \* \*